Dec. 16, 1958     J. ROSE     2,864,105
HOLDER AND WIPER FOR LABORATORY GLASS SLIDES
Filed Dec. 21, 1953
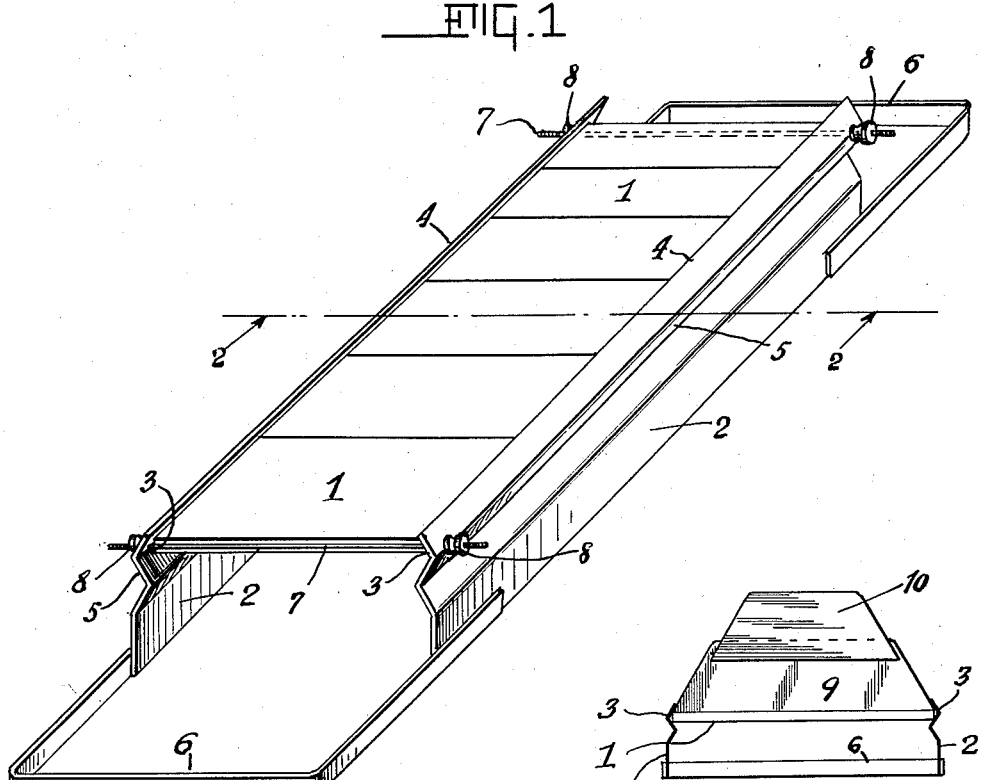
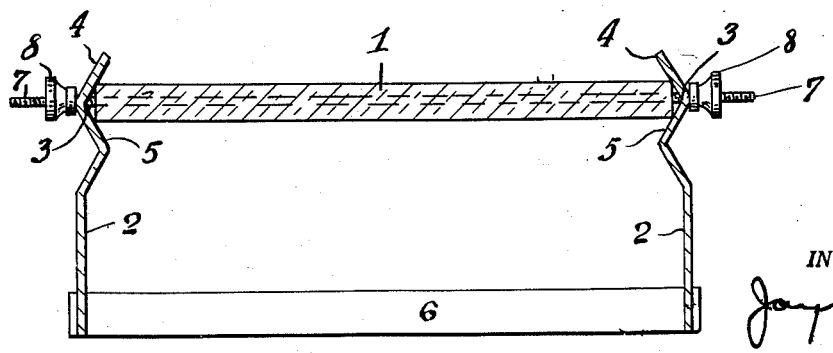
INVENTOR.

United States Patent Office 2,864,105
Patented Dec. 16, 1958

2,864,105

HOLDER AND WIPER FOR LABORATORY GLASS SLIDES

Jay Rose, New York, N. Y.

Application December 21, 1953, Serial No. 399,430

2 Claims. (Cl. 15—102)

This invention relates to a device for holding laboratory glass slides in the cleaning operation of the slides.

In my prior application Serial No. 280,928, filed April 7, 1952, now Patent No. 2,696,626, of Dec. 14, 1954, I have shown a device for holding the slides in spaced relation, the sides facing each other, and a comb-shaped wiper with prongs having resilient sides to wipe the sides of the slides.

My present invention has improvements and advantages in design and structure, is cheaper to make, easier to use and permits the wiping of the total area of the glass.

According to my present invention the slides are supported by their ends, in horizontal position, side by side, their surfaces fully exposed for wiping both sides and the wiper is adapted to reach the total area of the glass.

For a clearer understanding of the invention reference should be had to the accompanying drawing in which:

Fig. 1, is a perspective view.
Fig. 2, is a sectional view on line 2—2 of Fig. 1.
Fig. 3, is a view showing the use of the wiper.

In Fig. 1, the glass slide is indicated by numeral 1 and side plates by 2, 2. Angular grooves 3, 3 form jaws 4—5. Handles are indicated by 6, threaded rods by 7, nuts by 8, wiper by 9 and wiper handle by 10.

In Fig. 2, the slide is indicated by numeral 1, side plates by 2, angular grooves by 3, jaws by 4 and 5, handle by 6, threaded rod by 7, and nuts by 8.

In Fig. 3, the slide is indicated by 1, sides of the holder by 2, angular grooves by 3, handle by 6, wiper by 9 and wiper handle by 10.

The distance between the tips of the jaw blades 4—5 is less than the length of the slides so the slides cannot fall out. The rods 7 prevent the slides from sliding out of the holder after they are inserted in the holder and one or both may be removed after the cleaning of the slides to remove them from the holder. Other means may be used for this purpose.

The wiper 9 is made to fit the angle of the sides of the holder so that the full area of the glass slide is reached for wiping. After one side of the glass is wiped the holder is turned around and the other side of the glass is wiped. The wiper may be rubber or made from any suitable material. The parts of the holder are preferably made from stamped metal and either welded, riveted or soldered together.

The handles 6 form brackets to properly space the sides of the holder and to keep the sides in the predetermined spaced relation. The length of the sides is made to hold a desired number of slides. Holes are drilled or punched in the sides at the ends to permit the rods 7 to pass through.

I claim.

1. A device for removably holding and cleaning a plurality of laboratory slides comprising a pair of elongated slide holding members of a length to hold a plurality of slides in edge-to-edge relation, said members having V-shaped portions extending longitudinally along the entire slide holding length thereof, means joining said members in fixed spaced position relative to one another so that said members are maintained in fixed spaced parallel relation with the open portion of the V's in facing relation and the narrow portion of the V's are spaced apart a distance only sufficient for slidable insertion therebetween of said slides, and a wiping member slidably received between said V's having an end edge conforming to the surface of said slides and side edges extending from said end edge of a shape to fit within half the angle of the V's whereby said end edge contacts the entire surface of said slides.

2. A device for removably holding and cleaning a plurality of laboratory slides comprising a pair of elongated slide holding members of a length to hold a plurality of slides in edge-to-edge relation, said members having V-shaped portions extending longitudinally along the entire slide holding length thereof and supporting portions extending laterally from said V-shaped portions, means joining said supporting portions for maintaining said supporting portions in fixed spaced position relative to one another so that said members are maintained in fixed spaced parallel relation with the open portion of the V's in facing relation and the narrow portion of the V's are spaced apart a distance only sufficient for slidable insertion therebetween of said slides, said means for joining said supporting portions extending longitudinally from said supporting portions and bridging the space therebetween at a point beyond the slide holding length of the V-shaped portions whereby the slides are held with both faces thereof in unobstructed cleaning position, and a wiping member slidably received between said V's having an end edge conforming to the surface of said slides and side edges extending from said end edge of a shape to fit within half the angle of the V's whereby said end edge contacts the entire surface of said slides.

References Cited in the file of this patent

UNITED STATES PATENTS

| Number | Name | Date |
|---|---|---|
| 909,090 | James | Jan. 5, 1909 |
| 1,461,321 | Mathiotte | July 10, 1923 |
| 1,541,088 | Whitenack | June 9, 1925 |
| 1,676,637 | Di Bona et al. | July 10, 1928 |
| 1,747,770 | Griffin | Feb. 18, 1930 |
| 1,782,068 | Hazell | Nov. 18, 1930 |
| 2,636,614 | Morgan | Apr. 28, 1953 |

FOREIGN PATENTS

| Number | Country | Date |
|---|---|---|
| 13,399 | Germany | May 25, 1881 |
| 530,917 | France | Oct. 12, 1921 |